Figure 1:
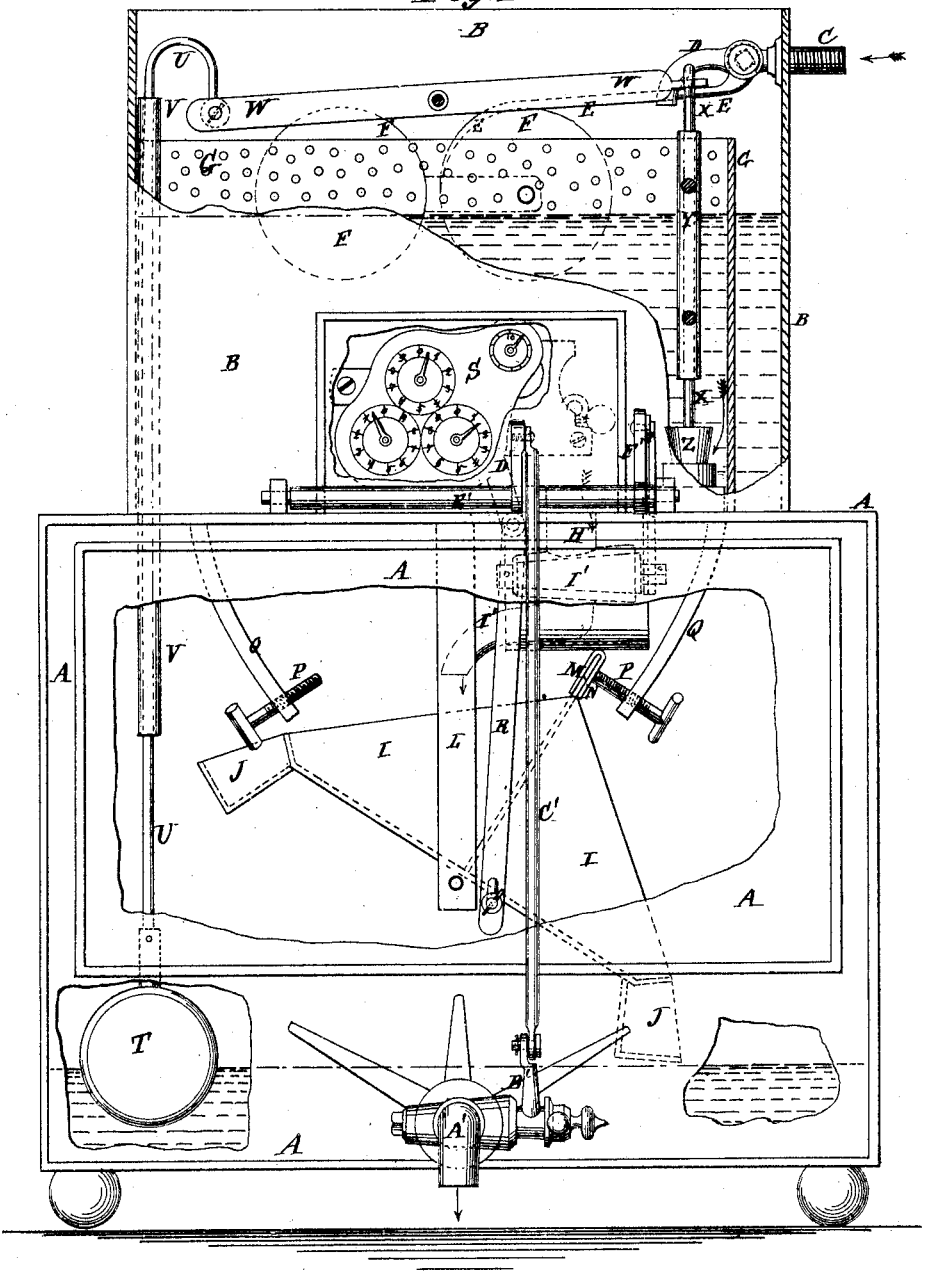

F. de P. BELLIDO.
Automatic Water-Meters.

No. 144,498.  Patented Nov. 11, 1873.

Witnesses:
A. W. Almqvist
P. Sedgwick

Inventor:
F. de P. Bellido
Per [signature]
Attorneys.

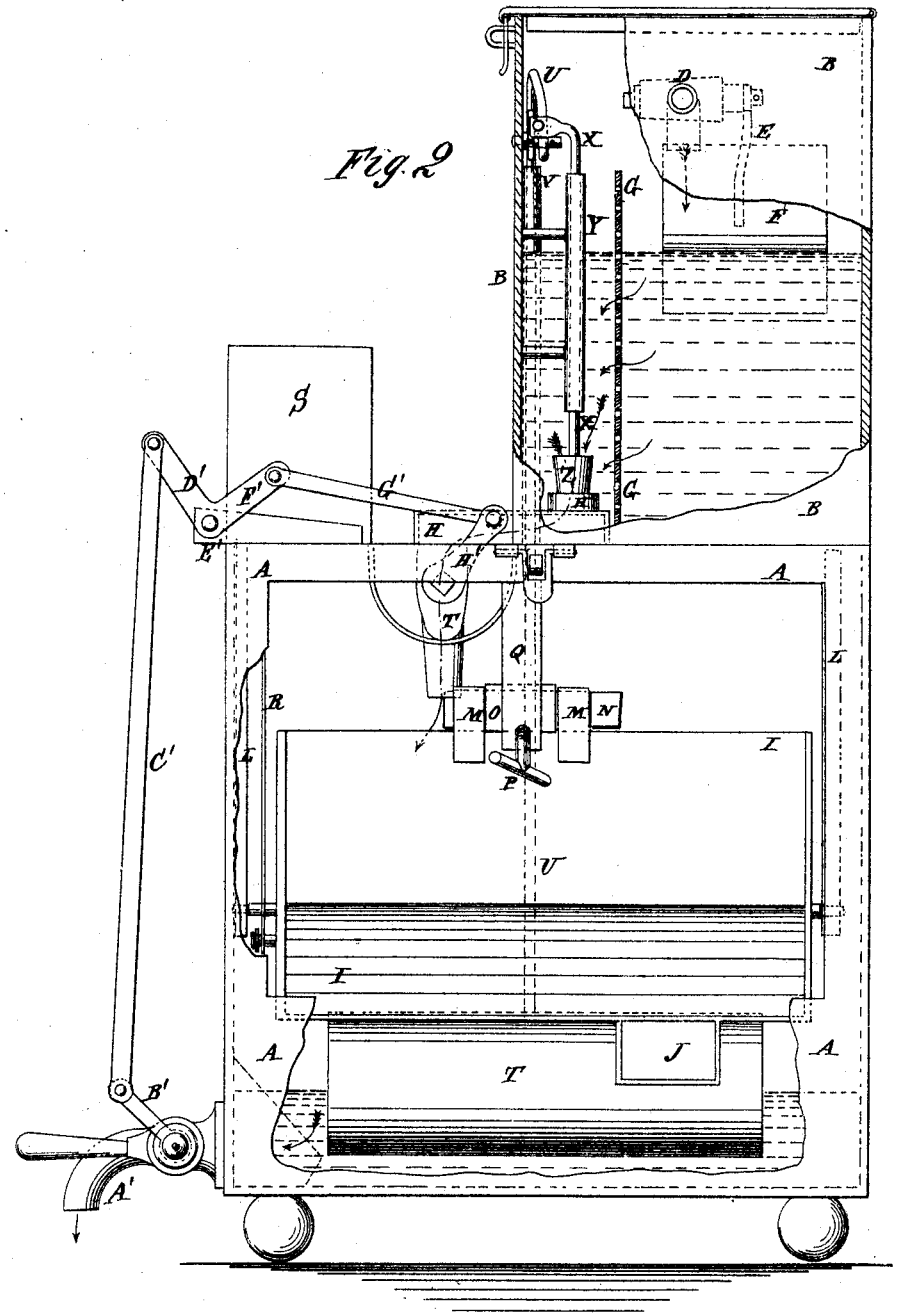

UNITED STATES PATENT OFFICE.

FRANCISCO DE PAULA BELLIDO, OF NEW YORK, N. Y.

IMPROVEMENT IN AUTOMATIC WATER-METERS.

Specification forming part of Letters Patent No. 144,498, dated November 11, 1873; application filed September 20, 1873.

*To all whom it may concern:*

Be it known that I, FRANCISCO DE PAULA BELLIDO, of the city, county, and State of New York, have invented a new and useful Improvement in Automatic Water-Meter, of which the following is a specification:

Figure 1, Sheet 1, is a front view of my improved meter, parts being broken away to show the construction. Fig. 2, Sheet 2, is a side view of the same, parts being broken away to show the construction.

Similar letters of reference indicate corresponding parts.

My invention has for its object to furnish an improved meter for measuring water and other liquids as they flow or are drawn from the reservoir, and which shall be simple in construction, inexpensive in manufacture, and accurate and reliable in operation. The invention consists in the float and arm, in combination with the upper chamber and inlet-faucet of the meter, for shutting off the water automatically; in the combination of the float, rod, lever, rod, and plug, with the lower and upper chambers of the meter, and with the discharge orifice or pipe for automatically interrupting the passage of the water from the said upper to the said lower chamber; in the combination of the cranks, shafts, and connecting-rods, or equivalent connections, and the faucet, with the drawing-off faucet, and with the orifice or pipe that conducts the liquid from the upper to the lower chamber of the meter; in the combination of the keepers, key or slide, rubber, and set-screws, with the central partition of the tilting-bucket, and with supports for said screws.

A represents the lower and larger of the two compartments into which the body of the meter is divided, and B is the upper and smaller compartment. C is the pipe through which the liquid flows into the meter, and which enters the meter at or near the top of the upper compartment B. To the inner end of the pipe C is secured a faucet, D, so that the inflow of the liquid may be regulated or interrupted, as desired. To the valve-plug of the faucet D is rigidly attached the end of an arm, E, the other end of which is attached to a float, F, which rests in the chamber B. The float F is made in the form of two short cylinders connected together by arms, so as to get great buoyancy while requiring little space. By this construction, as the water rises in the chamber B it raises the float F, and this closes the faucet D, stopping the inflow of water. G is a perforated sheet-metal or fine wire-gauze screen or partition shutting off a part of the chamber B, in the bottom of which is formed the discharge orifice or pipe H, through which the liquid escapes from the chamber B and flows into the chamber A. I is the bucket that receives the water from the pipe H. The ends of the bucket I are made in the form of isosceles triangles, with the third sides longer than the others, and having a plate attached to them, which plate forms the bottom of the bucket I. The side edges of the bottom plate of the bucket are bent upward a little, as shown in Fig. 1, and to the outer sides of the flanges thus formed are attached small boxes J, into which water is admitted from the bucket I through slots in the turned-up edges of the bottom plate of the bucket I. The bucket is divided into two compartments by a partition, the edges of which are secured to the middle part of the bottom and end plates of the said bucket. To the bottom of the bucket I, and in line with its division-plate, is attached a shaft, K, the ends of which work in bearings in the lower ends of the bars or hangers L, the upper ends of which are attached to the top of the chamber B. The bucket I is provided with supports, so that when either compartment is turned downward the bucket will remain in that position until the upper compartment has been filled with water, the weight of which will tilt the bucket and discharge the said water into the compartment A. To the middle part of the division-plate of the double bucket I are attached two keepers, M, to receive a narrow plate or key, N, which is slid through them above the edge of the said division-plate. The part of the key N between the keepers M is covered with rubber O, to deaden the sound as the tilting-bucket is stopped by the side of the key N striking against the forward end of the one or the other of the set-screws P. This construction of the device M N O enables the rubber to be conveniently replaced when worn or cut. The set-screws P pass through screw-holes in the lower end of the curved arms or hangers Q, the upper ends of which are secured to the top of the chamber A. By this construction, by adjusting the set-screws P, the amount of water required to tilt the bucket may be regulated with the greatest accuracy. The inflow of water into the boxes J insures the prompt tilting of the bucket when the exact amount of water has been received. To one end of the bucket I, a little at one side of its pivoting-point, is pivoted the lower end of a connecting-rod, R, the upper end of which is connected with the operating mechanism of an ordinary register, S, attached to the top of the chamber A, in front of the chamber B, so that it can be conveniently seen, and which is covered with a case, so that it cannot be tampered with. By this arrangement each movement of the bucket I, and, consequently, the exact amount of water passing through the meter, will be accurately measured and registered. T is a float placed in the chamber A, and to which is attached the lower end of a rod, U, which passes up through a pipe, V, which passes up into the upper chamber B, and serves as a guide to the rod U, and also prevents any water escaping from the said chamber B around the said rod U. The upper end of the rod U is bent over, as shown in Fig. 1, and to it is pivoted the end of a lever, W, which is pivoted to the side of the chamber B, and to its other end is pivoted the upper end of a rod, X. The rod X passes down through a guide, Y, attached to the side of the chamber B, and to its lower end is attached a plug, Z, fitting into the mouth of the discharge-pipe H. By this construction, when the water in the lower chamber A has reached the depth for which the float T has been adjusted, the said float rises, which operates the lever W and forces the plug Z into the pipe H, preventing the flow of any more water from the chamber B into the chamber A until the water has been drawn out of said chamber A, allowing the float T to sink, which withdraws the plug Z from the pipe H, and allows the water to again flow.

This device prevents fraud upon the part of the consumer, as, otherwise, by allowing the chamber A to fill with water the operation of the bucket I would be impeded or prevented, so that water might pass through the meter without being registered.

A' is the faucet by which the water is drawn out of the chamber A, as required. To the valve-plug of the faucet A' is rigidly attached a short arm, B', to the end of which is pivoted the lower end of a connecting-rod, C', the upper end of which is pivoted to a crank-arm, D', attached to a shaft, E', which works in bearings attached to the top of the chamber A, and to which is attached a second crank-arm, F'. To the crank-arm F' is pivoted the end of a connecting-rod, G', the other end of which is pivoted to the end of the crank-arm H', attached to the valve-plug of the faucet I', which is attached to the lower end of the pipe H. By this construction, when the faucet A' is opened to draw water the faucet I' will also be opened to allow water to flow from the chamber B into the chamber A, unless the plug Z has been forced into the pipe H by an excess of water in the chamber A.

In cases where the meter is to be connected with large pipes, for supplying a large amount of water in a short time, the faucet I' is replaced with another faucet provided with two discharge-pipes, and so constructed that exactly one-tenth of the water passing through the meter may be discharged through one of said discharge-pipes into the bucket I, to be measured, and the other nine-tenths will be discharged directly into the chamber A. The construction of this faucet I will not now describe, as I intend to make it the subject of a separate application.

Having thus described my invention, I claim as new and desire to secure by Letters Patent—

1. The float F, and arm E, in combination with the upper chamber B, and inlet-faucet D of the meter, for shutting off the water automatically, substantially as herein shown and described.

2. The combination of the float T, rod U, lever W, rod X, and plug Z, with the lower and upper chambers A B, and with the discharge orifice or pipe H for automatically interrupting the passage of water from the chamber B to the chamber A, substantially as herein shown and described.

3. The combination of the cranks, shafts, and connecting-rods B' C' D' E' F' G' H' or equivalent connections, and the faucet I', with the drawing-off faucet, and with the orifice or pipe H that conducts the liquid from the upper to the lower chamber of the meter, substantially as herein shown and described.

4. The combination of the keepers M, key or slide N, rubber O, and set-screws P, with the central partition of the tilting-bucket I, and with supports Q, substantially as herein shown and described.

FRANCISCO DE PAULA BELLIDO.

Witnesses:
 JAMES T. GRAHAM,
 T. B. MOSHER.